(12) United States Patent
Lai

(10) Patent No.: US 7,138,730 B2
(45) Date of Patent: Nov. 21, 2006

(54) TOPOLOGIES FOR MULTIPLE ENERGY SOURCES

(75) Inventor: Jih-Sheng Lai, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 566 days.

(21) Appl. No.: 10/302,724

(22) Filed: Nov. 22, 2002

(65) Prior Publication Data

US 2004/0100149 A1    May 27, 2004

(51) Int. Cl.
*H02J 1/00*    (2006.01)

(52) U.S. Cl. .......................... 307/82; 307/62; 363/16; 361/113

(58) Field of Classification Search ................. 307/62, 307/82, 58; 363/15, 16, 17; 361/113
See application file for complete search history.

(56) References Cited

U.S. PATENT DOCUMENTS

| | | | |
|---|---|---|---|
| 4,000,003 A | 12/1976 | Baker et al. ................... | 429/7 |
| 4,251,735 A | 2/1981 | Coleman ..................... | 307/46 |
| 4,800,476 A * | 1/1989 | Harada et al. ................ | 363/16 |
| 4,823,247 A * | 4/1989 | Tamoto ....................... | 363/16 |
| 5,334,463 A | 8/1994 | Tajima et al. .................. | 429/9 |
| 5,373,195 A | 12/1994 | De Doncker et al. ......... | 307/45 |
| 5,684,686 A | 11/1997 | Reddy ........................ | 363/97 |
| 5,710,699 A | 1/1998 | King et al. ................. | 363/132 |
| 6,002,603 A * | 12/1999 | Carver ........................ | 363/98 |
| 6,104,624 A * | 8/2000 | Iwamoto et al. .............. | 363/71 |
| 6,198,642 B1 | 3/2001 | Kociecki ...................... | 363/37 |
| 6,281,595 B1 * | 8/2001 | Sinha et al. .............. | 290/40 A |
| 6,369,461 B1 * | 4/2002 | Jungreis et al. ................ | 307/46 |
| 6,690,585 B1 * | 2/2004 | Betts-LaCroix .............. | 363/16 |
| 6,720,675 B1 * | 4/2004 | Azuma et al. ................. | 307/85 |

\* cited by examiner

*Primary Examiner*—Brian Sircus
*Assistant Examiner*—Daniel Cavallari
(74) *Attorney, Agent, or Firm*—Seed IP Law Group PLLC

(57) ABSTRACT

A system and method for converting power are disclosed. Briefly described, one embodiment comprises a first power source having a first-source positive terminal and a first-source negative terminal; a second power source having a second-source positive terminal and a second-source negative terminal; an output capacitor having an output-capacitor positive terminal operably coupled with the second-source positive terminal and an output-capacitor negative terminal operably coupled with the first-source negative terminal; a series electrical connection between the first-source positive terminal and the second-source negative terminal; a boost converter having a boost-converter input operably coupled with the series electrical connection and the first-source negative terminal, and a boost-converter output operably coupled with the output-capacitor positive and negative terminals; and a buck-boost converter having a buck-boost-converter input operably coupled with the series electrical connection and the second-source positive terminal, and a buck-boost-converter output operably coupled with the output-capacitor positive and negative terminals.

32 Claims, 9 Drawing Sheets

Voltage output as a function of primary converter duty cycle.

Note:
1. $V_d$ is the primary source voltage, $V_d \cong V_1 \approx$ constant
2. $V_{dc}$ is the dc bus voltage, $V_{dc} = V_d/(1-D)$
3. $V_u$ is the voltage difference between $V_{dc}$ and $V_d$, $V_u = V_{dc} - V_d > V_2$

TOPOLOGIES FOR MULTIPLE ENERGY SOURCES

BACKGROUND OF THE INVENTION

1. Field of the Invention

The present invention relates, in general, to electric power supplies employing either or both DC—DC power converters and DC-AC power inverters.

2. Description of the Related Art

Often, the electrical requirements of a load are incompatible with the electrical characteristics of an available electrical power source. For example, the voltage of the load may be incompatible with the voltage of the power source (e.g., a 24 volt load and a 12 volt source), or the current type of the power source may be incompatible with the current type of the load (e.g., an AC load and a DC source or a DC load and an AC source). In such situations, an electric power supply may remedy the incompatibility.

An electric power supply is a "translation" circuit that typically provides power with the characteristics required by the load from an electric power source with characteristics which may be incompatible with the characteristics required by the load. To perform this function, a power supply typically uses one or more instances of two types of circuits in some combination. One type of circuit is a DC—DC converter, which converts between different DC voltage levels (i.e., conversion). The other type of circuit is an inverter, which changes DC power from a DC power source to AC power (i.e., inversion), or changes AC power from an AC power source to DC power (i.e., rectification). A combination of DC—DC converters and DC-AC inverters/rectifiers are frequently used to supply power to an AC load from a DC power source.

Those skilled in the art will appreciate that in certain applications, such as when the load is an electric motor of an electric drive automobile, the draw on the power supply can change relatively quickly in time (e.g., the amount of current drawn at the rated voltage may increase relatively quickly). For example, when the driver of the automobile needs maximum acceleration, such as to merge with traffic, the current drawn by the AC motor is likely to increase rapidly.

Those skilled in the art will appreciate that certain types of DC power sources, such as fuel cells, are relatively good at supplying steady output power, but may not have as suitable a short term response. Accordingly, a need exists in the art for a method and system to augment a DC power source when power drawn from that power source changes at a faster rate than that at which the power source can adequately respond.

BRIEF SUMMARY OF THE INVENTION

In one embodiment, a system includes but is not limited to: a first power source having a first-source positive terminal and a first-source negative terminal; a second power source having a second-source positive terminal and a second-source negative terminal; an output capacitor having an output-capacitor positive terminal operably coupled with the second-source positive terminal and an output-capacitor negative terminal operably coupled with the first-source negative terminal; a series electrical connection between the first-source positive terminal and the second-source negative terminal; a boost converter having a boost-converter input operably coupled with the series electrical connection and the first-source negative terminal, and a boost-converter output operably coupled with the output-capacitor positive and negative terminals; and a buck-boost converter having a buck-boost-converter input operably coupled with the series electrical connection and the second-source positive terminal, and a buck-boost-converter output operably coupled with the output-capacitor positive and negative terminals.

In a second embodiment, an electrical power supply to supply electrical power between a first power source, a second power source, and a load, includes but is not limited to: a first node couplable to the first power source; a second node couplable to the second power source, the second node in series connection with the first node; a third node couplable to the load; a boost converter coupled between the first node and the third node; and a buck-boost converter coupled between the second node and the third node, wherein the buck-boost converter is operable to provide power from the second node to the third node at a first time, and the boost converter is operable to provide power from the first node to the third node at a second time.

In a third embodiment, a system includes but is not limited to: a boost converter having a boost-converter-input positive terminal and a boost-converter-input negative terminal and boost-converter-output terminals operably coupled with an output capacitor having output-capacitor positive and negative terminals; a buck-boost converter having a buck-boost-converter-input positive terminal and a buck-boost-converter-input negative terminal and buck-boost-converter-output terminals operably coupled with the output-capacitor positive and negative terminals; and a series electrical connection between the boost-converter-input positive terminal and the buck-boost-converter-input negative terminal.

In a fourth embodiment, a method for use with an electrical power supply includes but is not limited to: coupling a first-power-source negative terminal with an output-capacitor negative terminal; coupling a first-power-source positive terminal with a second-power-source negative terminal; coupling a second-power-source positive terminal with an output-capacitor positive terminal; coupling a buck-boost converter input with the second-power-source negative terminal and the second-power-source positive terminal; coupling a buck-boost converter output with the output-capacitor positive and negative terminals; coupling a boost converter input with the first-power-source positive terminal and the first-power-source negative terminal; and coupling a boost converter output with the output-capacitor positive and negative terminals.

In a fifth embodiment, a method of providing power includes but is not limited to: charging an output capacitor by boosting a voltage of a series connection between a first-power-source positive terminal and a second-power-source negative terminal when a first power source has output voltage within a defined tolerance; and charging the output capacitor by boosting and reversing the polarity of the voltage of the series connection between the first-power-source positive terminal and the second-power-source negative terminal when the first power source has output voltage outside of a defined tolerance.

In a sixth embodiment, a method of providing power includes but is not limited to: charging an output capacitor by boosting and reversing a polarity of a voltage of a series connection between a first-power-source positive terminal and a second-power-source negative terminal when a second power source has output voltage within a defined tolerance; and charging the output capacitor by boosting the voltage of the series connection between the first-power-source positive terminal and the second-power-source negative terminal when the second power source has output voltage outside of a defined tolerance.

In a seventh embodiment, a system includes but is not limited to: a first power source node having a first-node positive terminal and a first-node negative terminal; a second power source node having a second-node positive terminal and a second-node negative terminal; an output capacitor having an output-capacitor positive terminal operably coupled with the second-node positive terminal and an output-capacitor negative terminal operably coupled with the first-node negative terminal; a series electrical connection between the first-node positive terminal and the second-node negative terminal; and an inductor electrically connected to the series electrical connection, the inductor forming a part of a boost converter and the inductor forming a part of a buck-boost converter.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the non-limiting detailed description set forth herein.

BRIEF DESCRIPTION OF THE SEVERAL VIEWS OF THE DRAWINGS

The use of the same symbols in different drawings typically indicates similar or identical items.

DETAILED DESCRIPTION OF THE INVENTION

Figure 1:
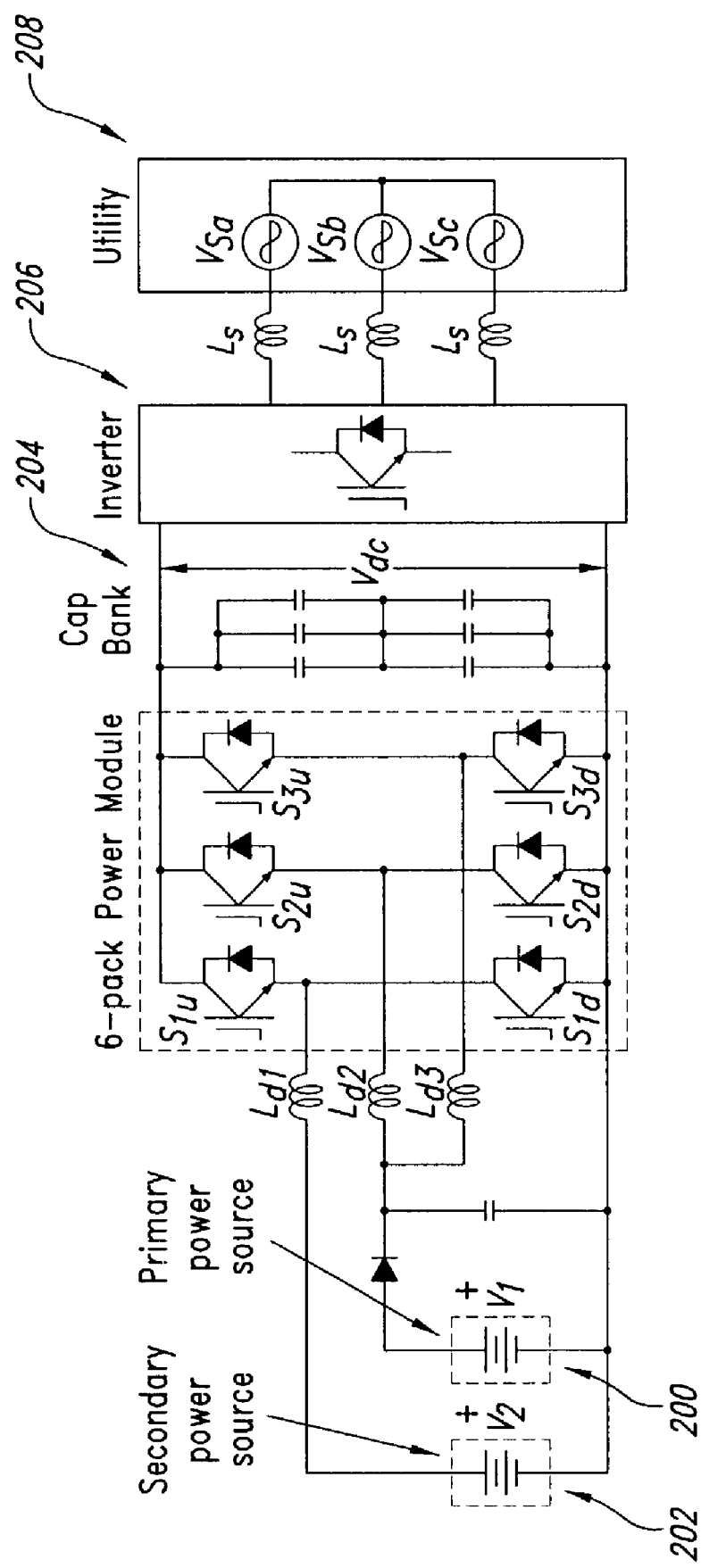
FIG. 1 is a schematic diagram of an electric power supply employing both DC—DC converters and DC-AC inverters.

FIG. 1 illustrates a related-art circuit configuration. A primary power source 200 (e.g., a fuel cell) having voltage $V_1$, and a secondary power source 202 (e.g., a battery) having voltage $V_2$ supply the power. Other examples of primary power source 200 include photovoltaic power sources, biomass power sources, geothermal power sources, etc. Other examples of secondary power source 202 include inertial devices or ultra capacitors. The output voltage $V_{dc}$ across capacitor bank 204 supplies a three-phase inverter 206, which inverts the DC input power to AC output power, and supplies the AC output power to a load such as a utility 208. In other applications, the voltage $V_{dc}$ can supply a DC load (not shown) or an inverter with any phase numbers such as single-phase and four-phase inverters (not shown).

Inductor $L_{d1}$, and switch-diode pairs $S_{1u}$ and $S_{1d}$, serve as a bi-directional dc—dc converter. With $S_{1u}$, inductor $L_{d1}$, and the anti-paralleled diode of $S_{1d}$, the circuit serves as a buck converter that can charge the voltage $V_2$ of the secondary power source 202 to a desired voltage. With $S_{1d}$, inductor $L_{d1}$, and the anti-paralleled diode of $S_{1u}$, the circuit serves as a boost converter that takes the secondary power source 202 voltage $V_2$ and boosts $V_2$ to the dc bus voltage $V_{dc}$.

Switch-diode pairs $S_{2u}$–$S_{2d}$ in conjunction with inductor $L_{d2}$, and switch-diode pairs $S_{3u}$–$S_{3d}$ in conjunction with inductor $L_{d3}$, serve as interleaved dc—dc boost converters of the power of primary power source 200. When switch-diode pairs $S_{2u}$–$S_{2d}$ in conjunction with inductor $L_{d2}$, and switch-diode pairs $S_{3u}$–$S_{3d}$ in conjunction with inductor $L_{d3}$ serve as interleaved dc—dc boost converters, only the lower switches $S_{2d}$ and $S_{3d}$ and anti-paralleled diodes of upper switches $S_{2u}$ and $S_{3u}$ are used. The interleaved boost converters take the power from primary power source 200 at voltage $V_1$ and boost the power to the dc bus voltage $V_{dc}$. If the power level is not high, and the ripple current of primary power source 200 is not strictly regulated, the two interleaved branches can be combined to one to reduce the device count. The advantages of using such an interleaved structure may include (1) input ripple current reduction, (2) individual component power rating reduction, and (3) fast current-loop control response.

The dc bus voltage $V_{dc}$ is a function of source voltage and duty cycle. Assuming that the duty cycle of the bottom switch is D, the expression of $V_{dc}$ is simply $V_{dc}=V_1/(1-D)$ or $V_{dc}=V_2/(1-D)$ depending on which voltage is larger. In a typical control system design, the primary power source 200 is normally designated as the steady-state power source that supplies energy constantly to establish the dc bus voltage, and the secondary power source 202 stabilizes the dc bus voltage fluctuation during dynamic load change conditions. Because D is always less than 1, $V_{dc}$ must be larger than $V_1$ and $V_2$. Ideally, the difference between $V_{dc}$ and $V_1$, or $V_{dc}$ and $V_2$ is small, because the devices need to handle a large current at low voltage side ($V_1$ or $V_2$) and withstand a high voltage of $V_{dc}$. However, the voltage difference is determined by the availability of the power sources and the utility voltage level, so in real-world systems this is not always possible.

FIG. 1 illustrates that the switches and diodes utilized by the interleaved boost converters are those of a commercially available standard "six-pack" module. From the foregoing description of the interleaved boost converters it can be seen that two switches and two diodes of the commercially available standard "six-pack" modules go unused, making the unused devices redundant. Such redundant and unused components constitute unneeded cost and complexity that are undesirable in virtually any system. However, in systems where the voltage level of either of the power sources 200, 202 driving the capacitor bank 204 is much lower than the dc bus voltage $V_{dc}$ (i.e., the voltage of capacitor bank 204) but the power is quite high, such as in most utility inter-tie systems, the unneeded cost and complexity are much more significant given the switch ratings and associated costs of high power electronics.

The present methods and systems may potentially save the cost of devices and components by reducing the required voltage and current ratings of such devices. In addition, the present methods and systems may further improve electric power supply controllability and reliability with less voltage and current stresses. Non-exhaustive examples of such methods and systems will now be discussed.

Figure 2A:
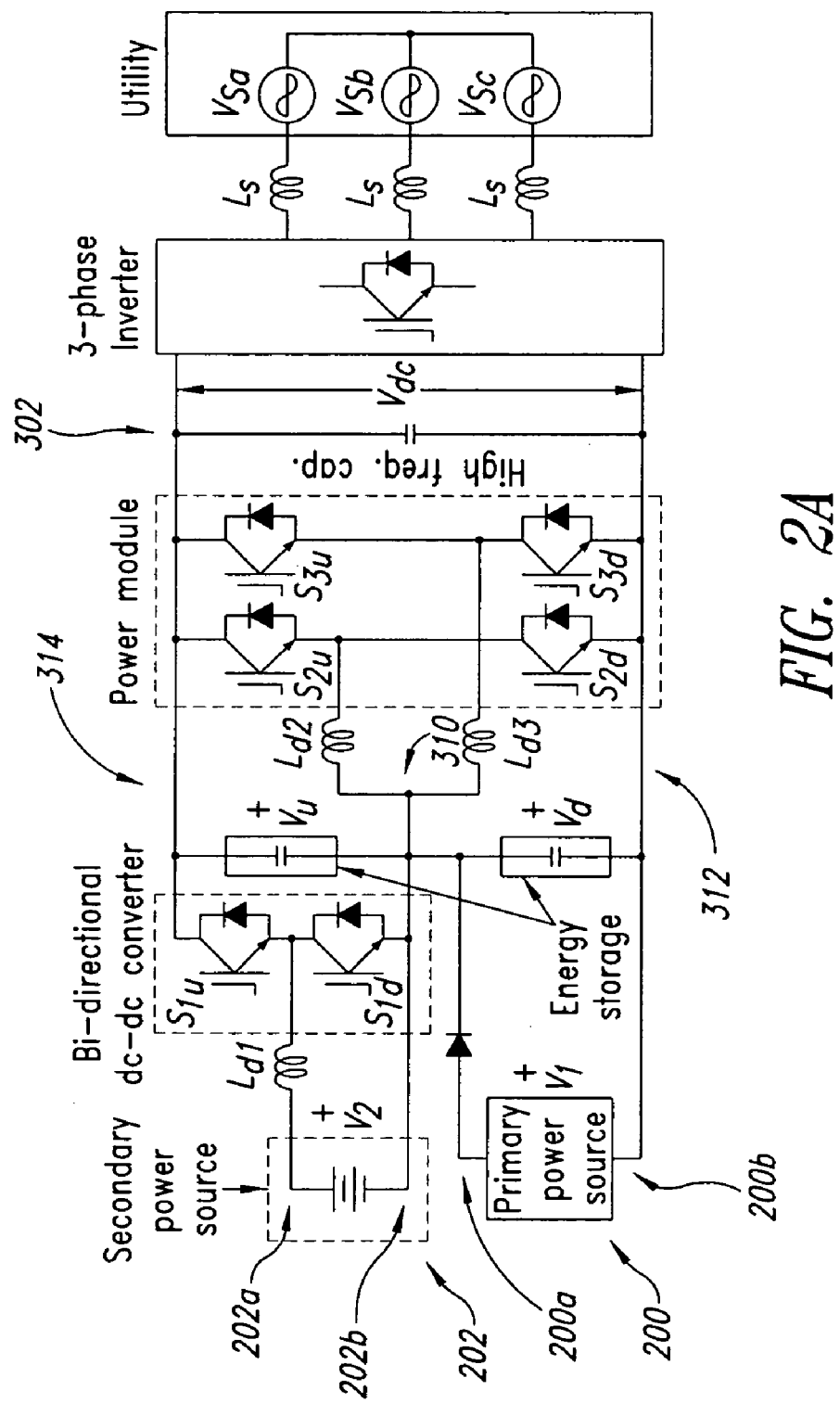
FIG. 2A illustrates an example of a method and system that utilize a boost converter with the primary power source, and a buck-boost converter with the secondary power source.

A. Method and System Using Boost Converter with the Primary Power Source and Buck-Boost Converter with the Secondary Power Source, where the Primary and Secondary Power Sources are Connected in Electrical Series FIG. 2A illustrates an example of a method and system that utilize a boost converter with the primary power source 200, and a buck-boost converter with the secondary power source 202. In this exemplary embodiment, the primary power source 200 may be viewed as a first power source having a first-source positive terminal 200a and a first-source negative terminal 200b, as indicated by the illustrated polarity of the voltage $V_1$ (denoted by the "+" symbol directly above the voltage "$V_1$"). Similarly, the secondary power source 202 may be viewed as a second power source having a second-source positive terminal 202a and a second-source negative terminal 202b, as indicated by the illustrated polarity of the voltage $V_2$ (denoted by the "+" symbol directly above the voltage "$V_2$"). The boost converter and the buck-boost converter are not indicated in isolation because in the example shown the boost converter and the buck-boost converter share components and connections. This is an unexpected structure and result, in that the functioning of the boost converter and the buck-boost converter are basically the obverse of each other. The functional operation of the main circuit in FIG. 2A can be divided into two modes: (1) boost converter operation and (2) buck-boost converter operation.

1. Boost Converter Operation

Figure 2B:
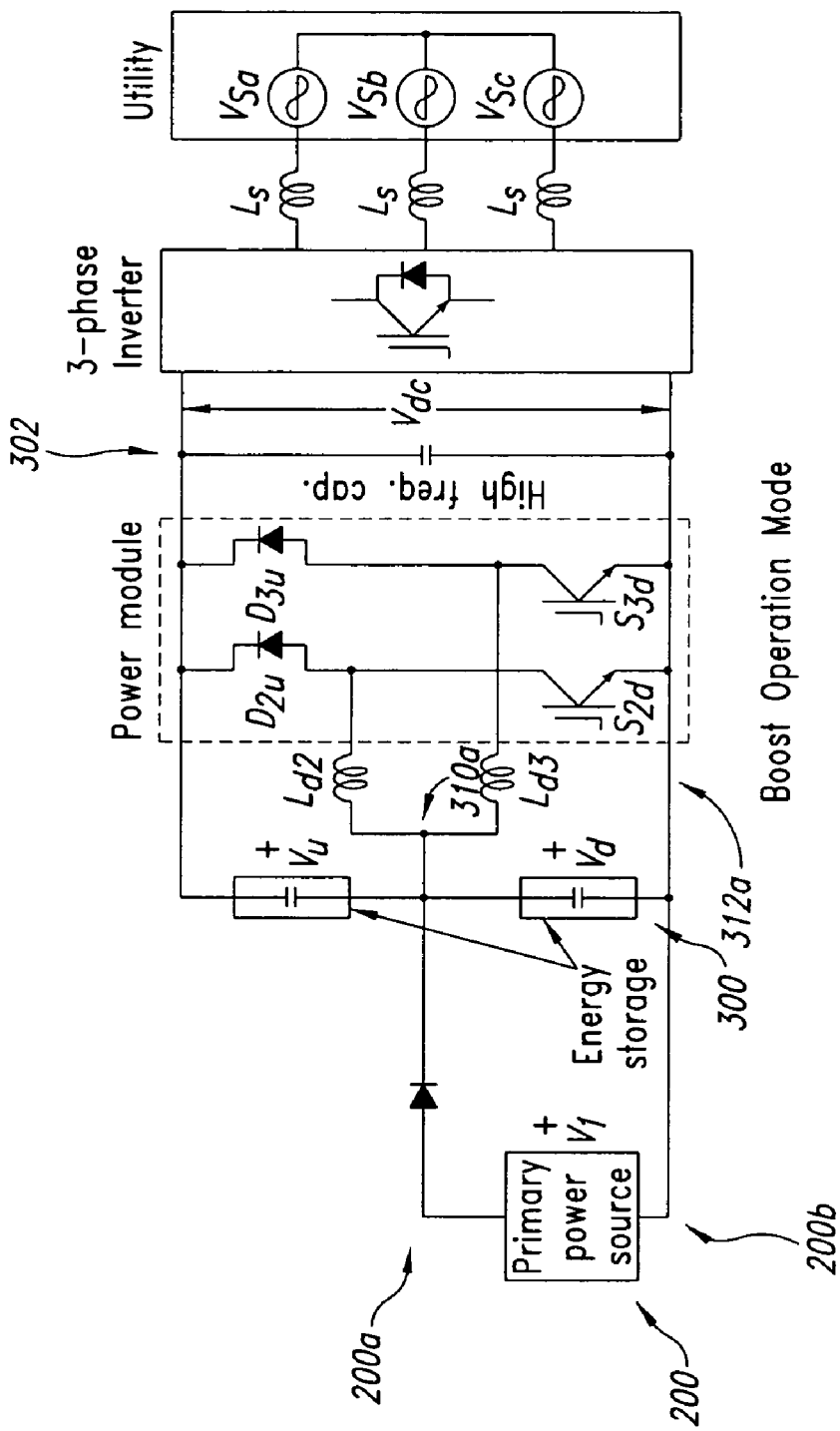
FIG. 2B illustrates the operation of a boost converter portion of the method and system of FIG. 2A.

FIG. 2B illustrates the operation of a boost converter portion of the method and system of FIG. 2A. Specifically, while a first boost converter composed of inductor $L_{d2}$ in conjunction with switch $S_{2d}$ and diode $D_{2u}$, and a second boost converter composed of inductor $L_{d3}$ in conjunction with switch $S_{3d}$ and diode $D_{3u}$ are shown in FIG. 2B, only the operation of the first boost converter is described herein for sake of clarity. The operation of the second boost converter can be understood by straightforward application of the discussion of the first boost converter, and it is to be understood that in one embodiment the first and the second boost converters operate in tandem.

Shown is that the input voltage of the first boost converter—where the first boost converter is composed of $L_{d2}$ in conjunction with switch $S_{2d}$ and diode $D_{2u}$—is what has been denoted lower-half voltage $V_d$. As used herein, the term "lower-half voltage $V_d$" is used relationally with the term "upper-half voltage $V_u$" to further emphasize certain unique and unexpected aspects of the methods and systems described herein. It is to be understood that where switches, voltages, or other components and parameters are referred to or subscripted herein as "upper," "lower," "up," "down," etc., such references are for convenience only, without regard to any orientation in space or location.

FIG. 2B also shows that in one embodiment the lower-half voltage $V_d$ is supplied by primary power source 200, and thus is the same as the voltage level $V_1$ of the primary power source 200. Depicted is that, in some implementations, an optional energy storage device 300 (e.g., an ultra capacitor) is also present at the input of the first boost converter. In operation, switch $S_{2d}$ is switched on and off by a control unit (not shown) using conventional control techniques so long as primary power source 200 is able to supply power sufficient such that the output voltage of high frequency capacitor 302 remains at $V_{dc}$.

When the first boost converter and the second boost converter—which as described above consist of inductors $L_{d2}$ and $L_{d3}$, switches $S_{2d}$ and $S_{3d}$ and diodes $D_{2u}$ and $D_{3u}$—are operating to produce a high dc bus voltage $V_{dc}$, the upper-half voltage, $V_u$, is the difference between $V_{dc}$ and $V_d$. Defining the duty cycle of the lower-half switch as D, the dc bus voltage can be obtained as $V_{dc}=V_d/(1-D)\cong V_1/(1-D)$.

Figure 2C:
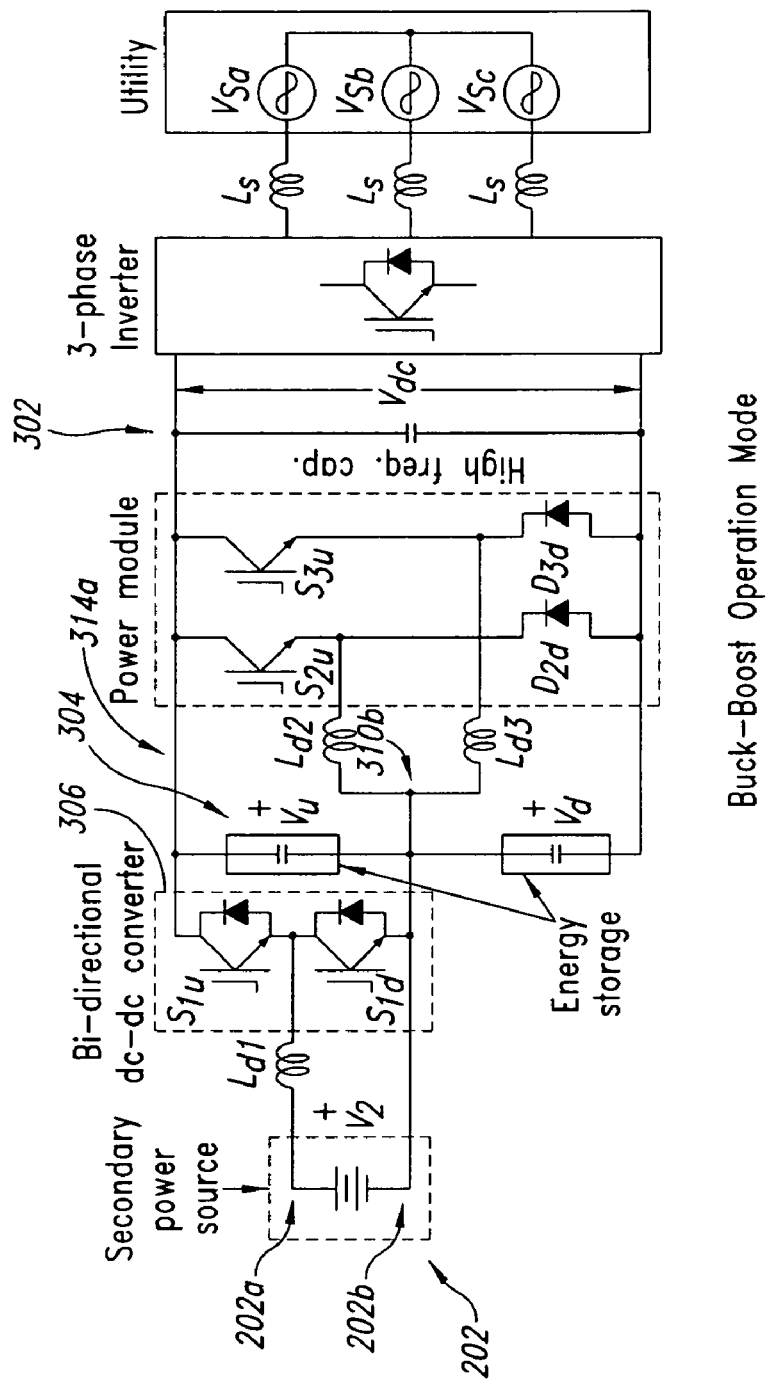
FIG. 2C illustrates the operation of a buck-boost converter portion of the method and system of FIG. 2A.

Notice that the input 310a, 312a (FIG. 2B) of the first boost converter has a specific polarity denoted by the polarities of primary power source 200, and (optional) energy storage device 300. Consequently, the input of the first boost converter can be viewed as having a positive terminal 310a and a negative terminal 312a. As will become apparent shortly, the buck-boost converter can also be viewed as having a positive terminal 314a and a negative terminal 310b (FIG. 2C). When the boost converter and the buck-boost converter are so viewed, it can be seen that, unlike the related art methods and systems, the positive terminal 310a (FIG. 2B) of the first boost converter is series connected with a negative terminal 310b (FIG. 2C) of a buck-boost converter in an unexpected and unique fashion.

2. Buck-Boost Converter Operation

FIG. 2C illustrates the operation of a buck-boost converter portion of the method and system of FIG. 2A. Specifically, while a first buck-boost converter composed of inductor $L_{d2}$ in conjunction with switch $S_{2u}$ and diode $D_{2d}$, and a second boost converter composed of inductor $L_{d3}$ in conjunction with switch $S_{3u}$ and diode $D_{3d}$ are shown in FIG. 2C, only the operation of the first buck-boost converter is described herein for sake of clarity. The operation of the second buck-boost converter can be understood by straightforward application of the discussion of the first boost converter, and it is to be understood that in one embodiment the first and the second buck-boost converters operate in tandem.

Shown is that the input voltage of the first buck-boost converter—where the first buck-boost converter is composed of inductor $L_{d2}$ in conjunction with switch $S_{2u}$ and diode $D_{2d}$—is what has been denoted upper-half voltage $V_u$. As used herein, the term "upper-half voltage" $V_u$ is used to relationally with the term "lower-half voltage $V_d$" to further emphasize certain unique and unexpected aspects of the methods and system described herein.

As will become apparent below, the first buck-boost converter in conjunction with the upper-half voltage $V_u$, can provide several services. One useful service provided by the first buck-boost converter is that it can provide power output in a complementary cycle when the primary power source 200 is not supplying power. One useful service provided by the upper-half voltage $V_u$ is that it stabilizes the lower-half voltage when the primary power source 200 supply has a time delay during dynamic load changes (e.g., as with a fuel cell used in an automobile, as described in the background section above).

Continuing to refer to FIG. 2C, in one embodiment, the voltage level $V_2$ of the secondary power source 202 is normally less than $V_u$ and can be boosted to $V_u$ so that the sum of $V_d$ and $V_u$ equals the dc bus voltage, $V_{dc}$. In one embodiment, switches $S_{1u}$ and $S_{1d}$ form bi-directional dc—dc converter 306 that utilizes $S_{1d}$ and the anti-paralleled diode of $S_{1u}$ as a boost converter and $S_{1u}$ and the anti-paralleled diode of $S_{1d}$ as a buck converter. In one embodiment, the buck converter allows the secondary power source, $V_2$, be charged by $V_u$ so that the state of charge of the secondary power source 202 can be maintained.

Continuing to refer to FIG. 2C, in one embodiment the upper-half voltage $V_u$ is supplied by a boosted version of the voltage $V_2$ of secondary power source 202. In some implementations, an optional energy storage device 304 (e.g., an ultra capacitor) is also present at the input of the first buck-boost converter. In operation, bi-directional dc—dc converter 306 is controlled by a control unit (not shown) using conventional techniques such that the boosted voltage $V_u$ of the voltage $V_2$ of secondary power source 202 is sufficient to supply the output voltage of high frequency capacitor 302 at $V_{dc}$.

Energy storage component 304, in one embodiment, is a large electrolytic capacitor or ultra capacitor. In one embodiment, an ultra capacitor is used with sufficient energy storage such that secondary power source 202 and associated bi-directional dc—dc converter 306 may not be necessary because $V_u$ can be charged during boost mode operation. Without secondary power source 202, the buck-boost converter operation is suitable for dc bus voltage conditioning during dynamic load changes.

Notice that the input 314a, 310b of the first buck-boost converter has a specific polarity denoted by the polarities of secondary power source 202, and (optional) energy storage device 304. Consequently, the input of the first buck-boost converter can be viewed as having a positive terminal 314a and a negative terminal 310b. In addition, the positive terminal 310a (FIG. 2B) of the first boost converter input is series connected with a negative terminal 310b (FIG. 2C) of the buck-boost converter. This is a very counterintuitive connection, and is the exact obverse of that taught in the related art.

3. Boost And Buck-Boost Converter Duty Cycles

As can be seen in FIGS. 2A–2C, any upper switch and series connected lower switch are preferably not turned on simultaneously (e.g., switches $S_{2u}$ and $S_{2d}$) since neither the buck-boost nor boost converter will operate in such a configuration. Consequently, the duty cycle of boost converter operation becomes the maximum available complementary duty cycle of buck-boost converter operation, and vice versa.

Figure 3:
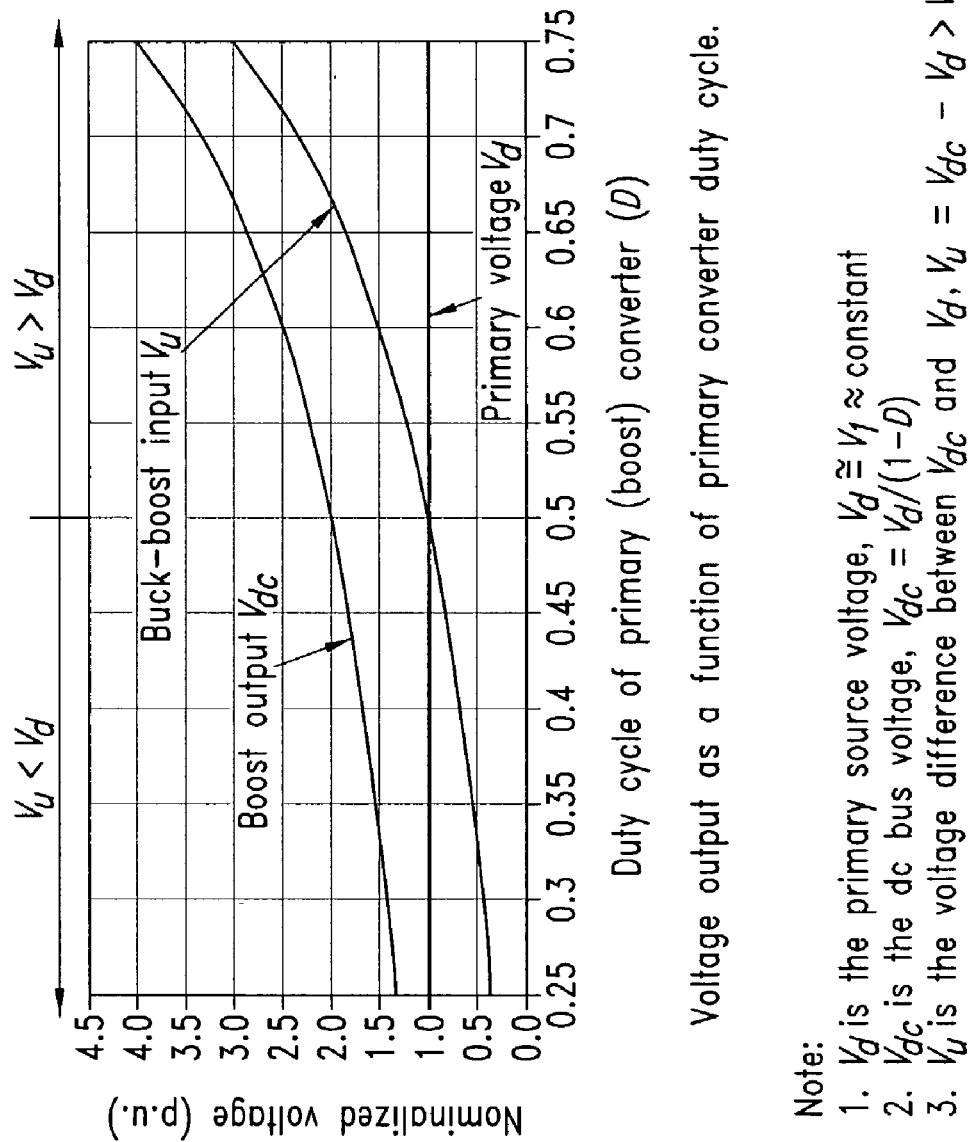
FIG. 3 shows the converter voltage as a function of the boost converter duty cycle, D.

FIG. 3 shows the converter voltage as a function of the boost converter duty cycle, D. If the primary power source 200 is constrained such that D<0.5, then $V_{dc} \leq 2V_d$ and $V_u < V_d$. If $V_{dc} > 2V_d$ is preferred, then the buck-boost converter preferably has an input voltage higher than $V_d$, i.e., $V_u > V_d$.

Figure 4A:
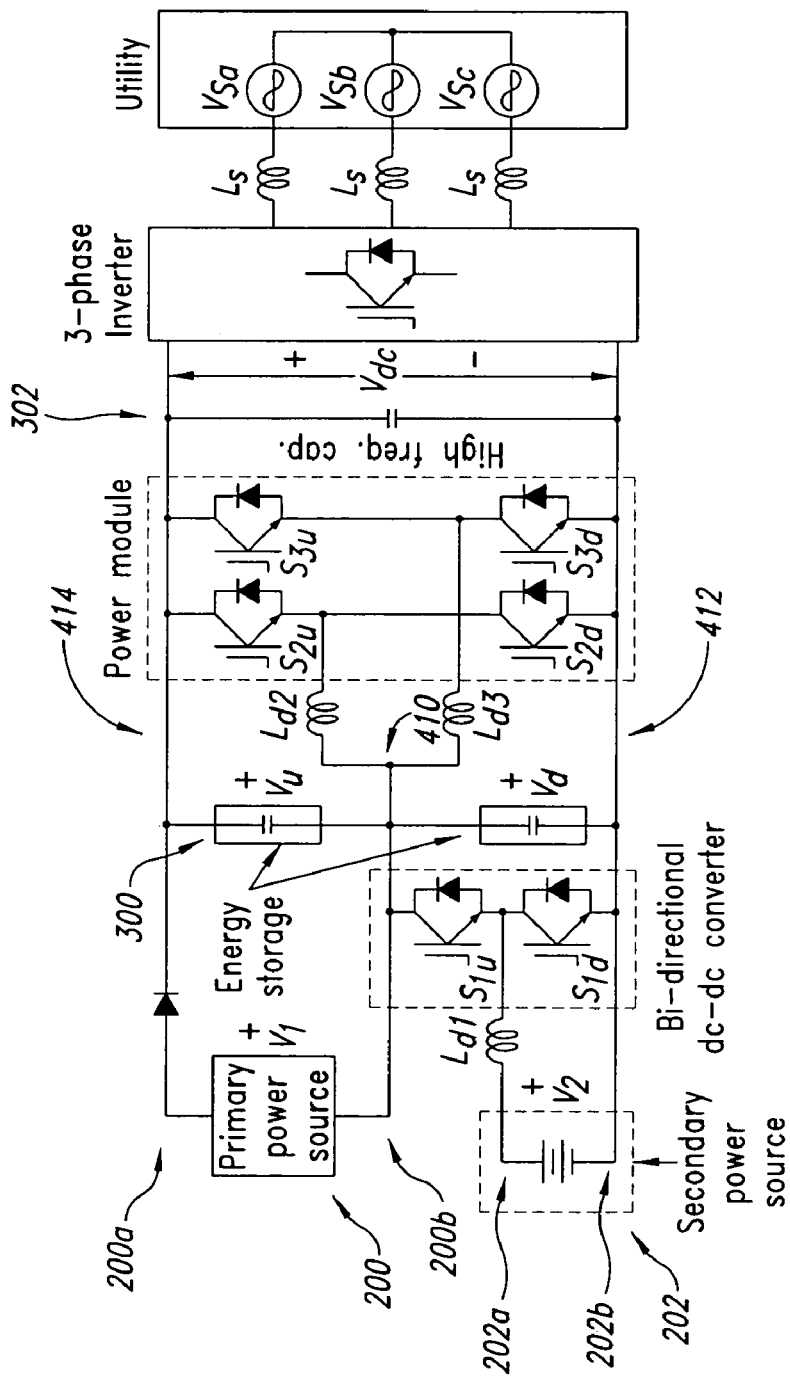
FIG. 4A illustrates an example of a method and system that utilize a buck-boost converter with the primary power source, and a boost converter with the secondary power source.

B. Method and System Using Buck-Boost Converter with the Primary Power Source and Boost Converter with the Secondary Power Source, where the Primary and Secondary Power Sources are Connected in Electrical Series FIG. 4A shows an example of a method and system that utilize a buck-boost converter with the primary power source 200, and a boost converter with the secondary power source 202. In this exemplary embodiment, the secondary power source 202 may be viewed as a first power source having a first-source positive terminal 202a and a first-source negative terminal 202b, as indicated by the illustrated polarity of the voltage $V_2$ (denoted by the "+" symbol directly above the voltage "$V_2$"). Similarly, the primary power source 200 may be viewed as a second power source having a second-source positive terminal 200a and a second-source negative terminal 200b, as indicated by the illustrated polarity of the voltage $V_1$ (denoted by the "+" symbol directly above the voltage "$V_1$"). The boost converter and the buck-boost converter are not indicated in isolation because in the example shown the boost converter and the buck-boost converter share components and connections. This is an unexpected structure and result, in that the functioning of the boost converter and the buck-boost converter are basically the obverse of each other. The functional operation of the method and system in FIG. 4A can be divided in two modes: (1) buck-boost converter operation and (2) boost converter operation.

1. Buck-Boost Converter Operation

Figure 4B:
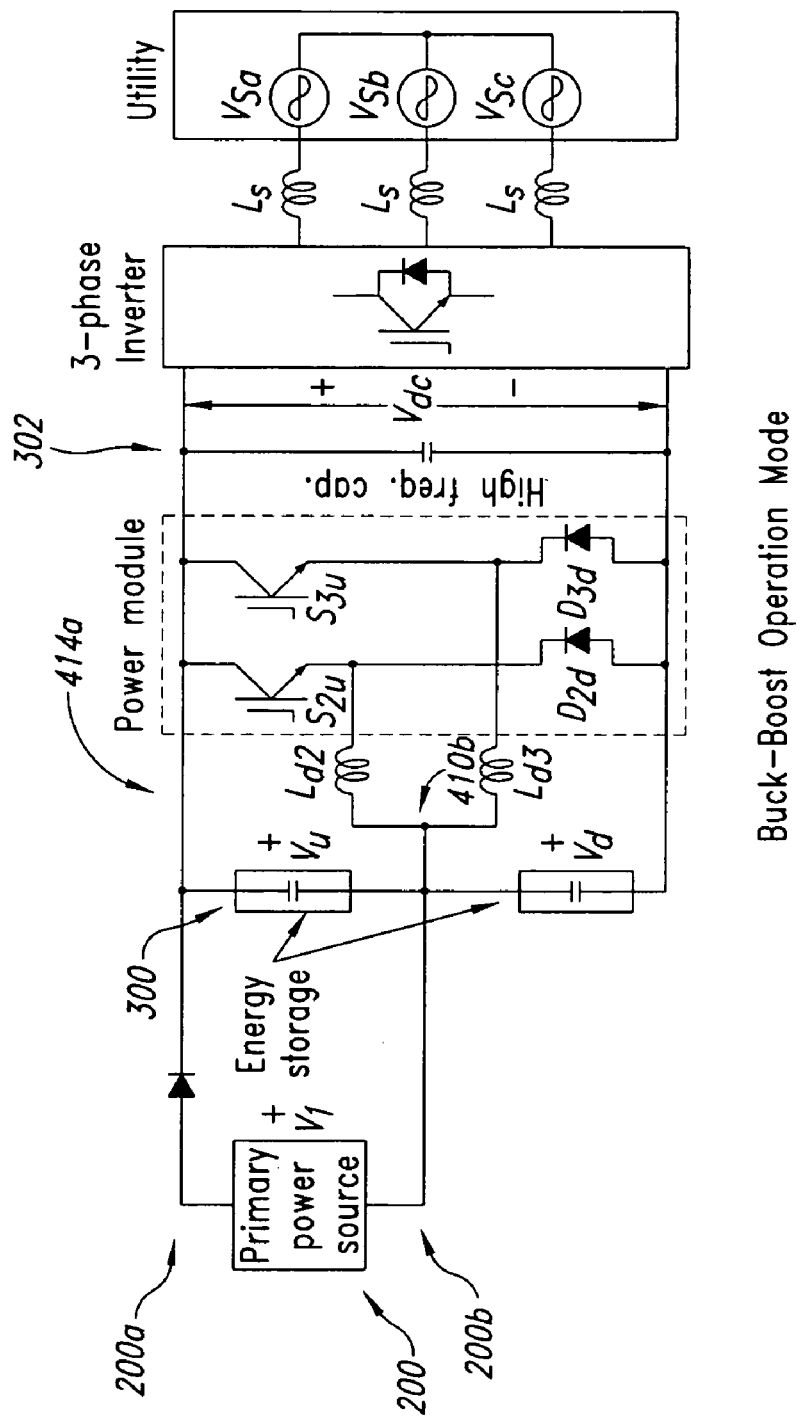
FIG. 4B illustrates the operation of a buck-boost converter portion of the method and system of FIG. 4A.

FIG. 4B illustrates the operation of a buck-boost converter portion of the method and system of FIG. 4A. Specifically, while a first buck-boost converter composed of inductor $L_{d2}$ in conjunction with switch $S_{2u}$ and diode $D_{2d}$, and a second boost converter composed of inductor $L_{d3}$ in conjunction with switch $S_{3u}$ and diode $D_{3d}$ are shown in FIG. 4B, only the operation of the first buck-boost converter is described herein for sake of clarity. The operation of the second buck-boost converter can be understood by straightforward application of the discussion of the first boost converter, and it is to be understood that in one embodiment the first and the second buck-boost converters operate in tandem.

The input voltage of the first buck-boost converter (i.e., inductor $L_{d2}$ in conjunction with switch $S_{2u}$ and diode $D_{2d}$)—is what has been denoted upper-half voltage $V_u$. As used herein, the term "upper-half voltage" $V_u$ is used relationally with the term "lower-half voltage" $V_d$ to further emphasize certain unique and unexpected aspects of the methods and system described herein.

FIG. 4B also shows that in one embodiment the upper-half voltage $V_u$ is supplied by primary power source 200, and thus is the same as the voltage level $V_1$ of the primary power source 200. In some implementations, an optional energy storage device 300 (e.g., an ultra capacitor) is also present at the input of the first boost converter. In operation, switch $S_{2d}$ is switched on and off by a control unit (not shown) using conventional control techniques so long as primary power source 200 is able to supply power sufficient such that the output voltage can be maintained at $V_{dc}$.

Notice that the input 414a, 410b (FIG. 4B) of the first buck-boost converter has a specific polarity denoted by the polarities of primary power source 200, and (optional) energy storage device 300. Consequently, the input of the first buck-boost converter can be viewed as having a positive terminal 414a and a negative terminal 410b. Moreover, the positive terminal 410a (FIG. 4C) of the first boost converter input (described below) is series connected with a negative terminal 410b (FIG. 4B) of the buck-boost converter. This is a very counterintuitive connection, and is the exact obverse of that taught in the related art.

When the first boost converter and the second boost converter (i.e., inductors $L_{d2}$ and $L_{d3}$, switches $S_{2d}$ and $S_{3d}$ and diodes $D_{2u}$ and $D_{3u}$) are operating to produce a high dc bus voltage $V_{dc}$, the upper-half voltage $V_u$ is the difference between $V_{dc}$ and $V_d$. Defining the duty cycle of the lower-half switch as D, the dc bus voltage can be obtained as $V_{dc} = V_d/(1-D) \cong V_1/(1-D)$.

When the first buck-boost converter and the second buck-boost converter (i.e., inductors $L_{d2}$ and $L_{d3}$, switches $S_{2u}$ and $S_{3u}$ and diodes $D_{2d}$ and $D_{3d}$) are operating, a consequence of their operation is that they produce lower-half voltage $V_d$. The sum of $V_d$ and $V_u$ is the dc bus voltage $V_{dc}$. Defining the duty cycle of the upper-half switch as D, the lower-half and dc bus voltages can be obtained as $V_d = V_u \times D/(1-D) \cong V_1 \times D/(1-D)$ and $V_{dc} = V_u + V_d$.

2. Boost Converter Operation

Figure 4C:
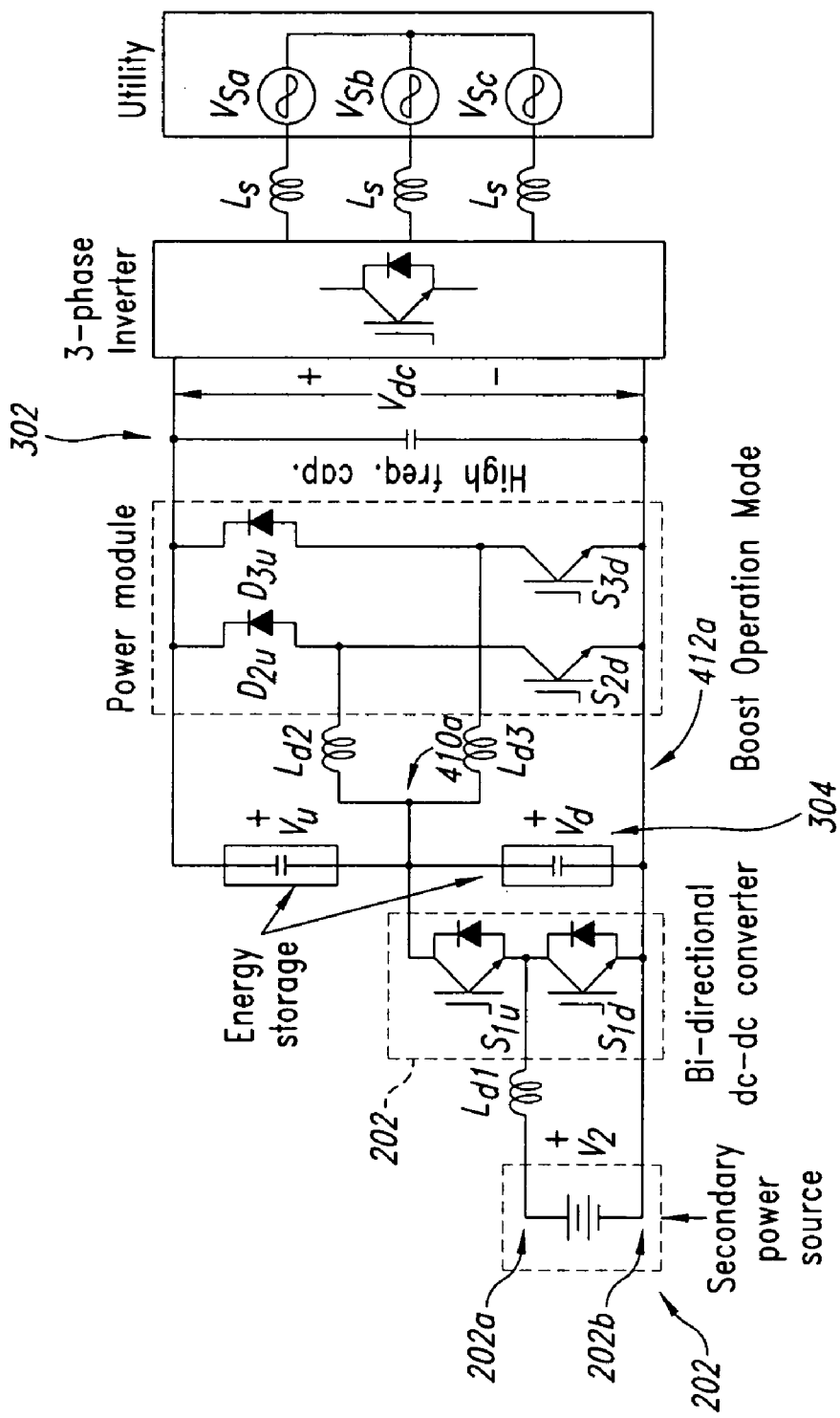
FIG. 4C illustrates the operation of a boost converter portion of the method and system of FIG. 4A.

FIG. 4C illustrates the operation of a boost converter portion of the method and system of FIG. 4A. Specifically, while a first boost converter composed of inductor $L_{d2}$ in conjunction with switch $S_{2d}$ and diode $D_{2u}$, and a second boost converter composed of inductor $L_{d3}$ in conjunction with switch $S_{3d}$ and diode $D_{3u}$ are shown in FIG. 4C, only the operation of the first boost converter is described herein for sake of clarity. The operation of the second boost converter can be understood by straightforward application of the discussion of the first boost converter, and it is to be understood that in one embodiment the first and the second boost converters operate in tandem.

The input voltage of the first boost converter (i.e., inductor $L_{d2}$ in conjunction with switch $S_{2d}$ and diode $D_{2u}$) is what has been denoted lower-half voltage $V_d$. As used herein, the term "upper-half voltage $V_u$" is used to relationally with the term "lower-half voltage $V_d$" to further emphasize certain unique and unexpected aspects of the methods and system described herein. The difference of $V_{dc}$ and $V_u$ becomes $V_d$.

As will become apparent below, the first boost converter in conjunction with $V_d$ can provide several services. The first boost converter can provide power output in a complementary cycle when the primary power source 200 (FIGS. 4A and 4B) is not supplying power. Additionally, or alternatively, the voltage $V_d$ stabilizes the upper-half voltage $V_u$ when the primary power source 200 supply has a time delay during dynamic load changes, such as was outlined in the background section above.

FIG. 4C also shows that in one embodiment, the voltage level $V_2$ of the secondary power source 202 normally operates at less than $V_d$ and can be boosted to $V_d$ so that the sum of $V_d$ and $V_u$ equals the desired dc bus voltage $V_{dc}$. In one embodiment, switches $S_{1u}$ and $S_{1d}$ form bi-directional dc—dc converter 306 that utilizes $S_{1d}$ and the anti-paralleled diode of $S_{1u}$ as a boost converter and $S_{1u}$ and the anti-paralleled diode of $S_{1d}$ as a buck converter. The buck converter allows the secondary power source $V_2$ be charged by $V_d$ so that the state of charge of the secondary power source 202 can be maintained.

In one embodiment the lower-half voltage $V_d$ is supplied by a boosted version of the voltage $V_2$ of secondary power source 202. In some implementations, an optional energy storage device 304 (e.g., an ultra capacitor) is also present at the input of the first buck-boost converter. In operation, bi-directional dc—dc converter 306 is controlled by a control unit (not shown) such that the boosted version $V_d$ of the voltage $V_2$ of secondary power source 202 voltage is sufficient such that the buck-boost converter can boost $V_d$ enough to supply the output voltage of high frequency capacitor 302 at $V_{dc}$.

Notice that the input 410a, 412a (FIG. 4C) of the first boost converter has a specific polarity denoted by the polarities of secondary power source 202, and (optional) energy storage device 304. Consequently, the input of the first boost converter can be viewed as having a positive terminal 410a and a negative terminal 412a. Furthermore, the positive terminal 410a (FIG. 4C) of the first boost converter input is series connected with a negative terminal 410b (FIG. 4B) of the first buck-boost converter. This is a very counterintuitive connection, and is the exact obverse of that taught in the related art.

3. Buck-Boost Converter And Boost Converter Duty Cycles

FIGS. 4A–4C show that any upper switch and lower series connected switch are preferably not turned on simultaneously (e.g., switches $S_{2u}$ and $S_{2d}$) since neither the buck-boost nor boost converter will operate in such a configuration. Because the upper switch and lower switch cannot be turned on simultaneously, the duty cycle of buck-boost mode operation becomes the maximum available complementary duty cycle of boost mode operation, and vice versa.

Figure 5:
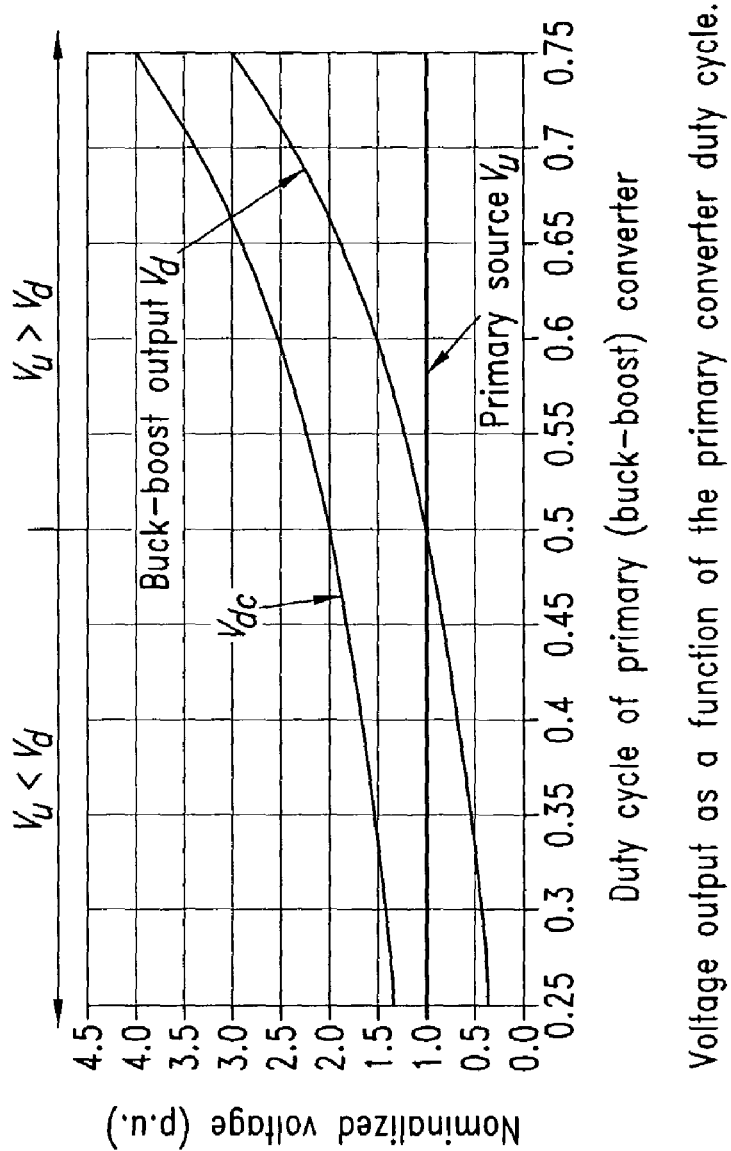
FIG. 5 shows the converter voltage as a function of the buck-boost converter duty cycle, D.

FIG. 5 shows the converter voltage as a function of the buck-boost converter duty cycle, D. If the primary power source 200 is constrained to D<0.5, then $V_u < V_d$ and $V_{dc} \leq 2V_d$. If $V_{dc} > 2V_d$ is preferred, then the boost converter is to have an input voltage higher than the primary power source voltage, $V_u$, i.e., $V_d > V_u$.

From the foregoing it will be appreciated that, although specific embodiments of the invention have been described herein for purposes of illustration, various modifications may be made without deviating from the spirit and scope of the invention. For example, additional applications of the subject matter described herein include but are not limited to distributed generation converters, microturbine power converters, utility interactive load-banks, photovoltaic source supplied inverters, systems using fuel cells or batteries or other storage devices UPS (uninterruptable power supplies) implementations using power converters, as well as electric, fuel and hybrid electric powertrains. Accordingly, the invention is not limited except as by the appended claims.

The invention claimed is:

1. A system comprising:
   a first direct current (DC) power source having a first-source positive DC terminal and a first-source negative DC terminal;
   a second DC power source having a second-source positive DC terminal and a second-source negative DC terminal;
   an output capacitor having an output-capacitor positive terminal operably coupled with the second-source positive DC terminal and an output-capacitor negative terminal operably coupled with the first-source negative DC terminal;
   a series electrical connection between the first-source positive DC terminal and the second-source negative DC terminal;
   a boost converter having a boost-converter DC input operably coupled with the series electrical connection and the first-source negative DC terminal, and a boost-converter DC output operably coupled with the output-capacitor positive and negative terminals; and
   a buck-boost converter having a buck-boost-converter DC input operably coupled with the series electrical connection and the second-source positive DC terminal, and a buck-boost-converter DC output operably coupled with the output-capacitor positive and negative terminals.

2. The system of claim 1 wherein the boost converter and the buck-boost converter share an inductor electrically connected with the series electrical connection.

3. The system of claim 1 wherein the boost converter having the boost-converter DC input operably coupled with the series electrical connection and the first-source negative DC terminal, and the boost-converter DC output operably coupled with the output-capacitor positive and negative terminals comprises:
   a first diode having a first-diode anode (+) and a first-diode cathode (−), the first-diode cathode (−) operably coupled with the output-capacitor positive terminal;
   a first switch operably coupled between the first-diode anode (+) and the first-source negative DC terminal; and
   an inductor operably coupled between the series electrical connection and the first-diode anode (+).

4. The system of claim 1 wherein the buck-boost converter having the buck-boost converter DC input operably coupled with the series electrical connection and the second-source positive DC terminal, and the buck-boost converter DC output operably coupled with the output-capacitor positive and negative terminals comprises:
   a first diode having a first-diode anode (+) and a first-diode cathode (−), the first-diode anode (+) operably coupled with the output-capacitor negative terminal;
   a first switch operably coupled between the first diode cathode (−) and the second-source positive DC terminal; and
   an inductor operably coupled between the series electrical connection and the first-diode cathode (−).

5. The system of claim 1, further comprising:
   a switch of the buck-boost converter operably coupled with a diode of the boost converter such that the diode of the boost converter is not forward biased when the switch of the buck-boost converter is transferring current.

6. The system of claim 1, further comprising:
   a switch of the boost converter operably coupled with a diode of the buck-boost converter such that the diode of the buck-boost converter is not forward biased when the switch of the boost converter is transferring current.

7. The system of claim 1, further comprising:
   an energy storage component connected in electrical parallel with the first DC power source.

8. The system of claim 7, further comprising:
   a bi-directional dc—dc converter having an input operably coupled with the first DC power source and an output operably coupled with the energy storage component.

9. The system of claim 1, further comprising:
   an energy storage component connected in electrical parallel with the second DC power source.

10. The system of claim 9, further comprising:
    a bi-directional dc—dc converter having an input operably coupled with the second DC power source and an output operably coupled with the energy storage component.

11. The system of claim 1, further comprising:
    a 3-phase inverter operably coupled with the output capacitor.

12. The system of claim 1 wherein the first DC power source comprises:
    at least one of a fuel cell, a battery, an electrolytic capacitor, and an ultra capacitor.

13. The system of claim 1 wherein the second DC power source comprises:
    at least one of a fuel cell, a battery, an electrolytic capacitor, and an ultra capacitor.

14. An electrical power supply to supply electrical power between a first power source, a second power source, and a load, wherein the first power source is in serial connection with the second power source the electrical power supply comprising:
    a boost converter coupled between the first power source and the load; and
    a buck-boost converter coupled between the second power source and the load, wherein the buck-boost converter is operable to provide power from the second power source to the load at a first time, and the boost converter is operable to provide power from the first power source to the load at a second time,
    wherein the buck-boost converter is further operable to provide power from the load to the second power source at a third time.

15. The electrical power supply of claim 14 wherein the second power source is rechargeable.

16. An electrical power supply to supply electrical power between a first power source, a second power source, and a load, wherein the first power source is in serial connection with the second power source, the electrical power supply comprising:
    a boost converter coupled between the first power source and the load; and
    a buck-boost converter coupled between the second power source and the load, wherein the buck-boost converter is operable to provide power from the second power source to the load at a first time, and the boost converter is operable to provide power from the first power source to the load at a second time; and
    an inverter electrically coupled between the load and the boost and the buck-boost converters.

17. The electrical power supply of claim 16 wherein the second power source is rechargeable.

18. A system for use with a first direct current (DC) power source and a second DC power source, the system comprising:
    a boost converter having a boost-converter-input positive DC terminal and a boost-converter-input negative DC terminal and boost-converter-output DC terminals operably coupled with an output capacitor having output-capacitor positive and negative terminals;
    a buck-boost converter having a buck-boost-converter-input positive DC terminal and a buck-boost-converter-input negative DC terminal and buck-boost-converter-output DC terminals operably coupled with the output-capacitor positive and negative terminals; and
    a series electrical connection between the boost-converter-input positive DC terminal and the buck-boost-converter-input negative DC terminal.

19. The system of claim 18 wherein the boost converter and the buck-boost converter share an inductor electrically connected with the series electrical connection.

20. The system of claim 18, further comprising:
    a 3-phase inverter operably coupled with the output capacitor.

21. The system of claim 20, further comprising:
    a 3-phase load operably coupled with the 3-phase inverter.

22. The system of claim 18 wherein the first DC power source comprises:
    at least one of a fuel cell, a battery, an electrolytic capacitor, and an ultra capacitor operably coupled with the buck-boost converter.

23. The system of claim 18 wherein the second DC power source comprises:
    at least one of a fuel cell, a battery, an electrolytic capacitor, and an ultra capacitor operably coupled with the buck-boost converter.

24. A method for use with an electrical power supply, the method comprising:
    coupling a first-power-source negative DC terminal with an output-capacitor negative DC terminal;
    coupling a first-power-source positive DC terminal with a second-power-source negative terminal;
    coupling a second-power-source positive DC terminal with an output-capacitor positive terminal;
    coupling a buck-boost converter DC input with the second-power-source negative DC terminal and the second-power-source positive DC terminal;

coupling a buck-boost converter DC output with the output-capacitor positive and negative terminals;

coupling a boost converter DC input with the first-power-source positive DC terminal and the first-power-source negative DC terminal; and coupling a boost converter DC output with the output-capacitor positive and negative terminals.

25. The method of claim 24, further comprising:

coupling a 3-phase inverter with the output capacitor positive and negative terminals.

26. The method of claim 25, further comprising:

coupling a 3-phase load with the 3-phase inverter.

27. A system comprising:

a first power source node having a first-node positive terminal and a first-node negative terminal;

a second power source node having a second-node positive terminal and a second-node negative terminal;

an output capacitor having an output-capacitor positive terminal operably coupled with the second-node positive terminal and an output-capacitor negative terminal operably coupled with the first-node negative terminal;

a series electrical connection between the first-node positive terminal and the second-node negative terminal; and an inductor electrically connected to the series electrical connection, the inductor forming a part of a boost converter and the inductor forming a part of a buck-boost converter.

28. The system of claim 27 wherein the inductor electrically connected to the series electrical connection, the inductor forming a part of a boost converter and the inductor forming a part of a buck-boost converter further comprises:

a boost-converter diode and a boost-converter switch electrically connected with the inductor;

a buck-boost-converter diode and a buck-boost-converter switch electrically connected with the inductor; and the boost-converter switch connected in electrical parallel with the buck-boost-converter diode such that the buck-boost-converter diode is not forward biased when the boost-converter switch is transferring current.

29. The system of claim 27, wherein the inductor electrically connected to the series electrical connection, the inductor forming a part of a boost converter and the inductor forming a part of a buck-boost converter comprises:

a boost-converter diode and a boost-converter switch electrically connected with the inductor;

a buck-boost-converter diode and a buck-boost-converter switch electrically connected with the inductor; and the buck-boost-converter switch connected in electrical parallel with the boost-converter diode such that the boost-converter diode is not forward biased when the buck-boost-converter switch is transferring current.

30. The system of claim 27, further comprising:

a 3-phase inverter operably coupled with the output capacitor.

31. The system of claim 27 wherein the first power source node comprises:

a connector configured for detachably connecting to at least one terminal of at least one of a fuel cell, a battery, an electrolytic capacitor, and an ultra capacitor.

32. The system of claim 27 wherein the second power source node comprises:

a connector configured for permanently connecting to at least one terminal of at least one of a fuel cell, a battery, an electrolytic capacitor, and an ultra capacitor.

* * * * *

UNITED STATES PATENT AND TRADEMARK OFFICE
CERTIFICATE OF CORRECTION

PATENT NO.       : 7,138,730 B2                                   Page 1 of 1
APPLICATION NO.  : 10/302724
DATED            : November 21, 2006
INVENTOR(S)      : Jih-Sheng Lai It is certified that error appears in the above-identified patent and that said Letters Patent is hereby corrected as shown below:

Title Page
Item (54) "TOPOLOGIES FOR MULTIPLE ENERGY SOURCES" should read as --TOPOLOGIES FOR USING MULTIPLE ENERGY SOURCES FOR POWER CONVERSIONS--

Signed and Sealed this

Tenth Day of April, 2007

JON W. DUDAS
*Director of the United States Patent and Trademark Office*